(12) United States Patent
Tzou et al.

(10) Patent No.: US 8,362,116 B2
(45) Date of Patent: Jan. 29, 2013

(54) LOW DIELECTRIC RESIN VARNISH COMPOSITION FOR LAMINATES AND THE PREPARATION THEREOF

(75) Inventors: Ming Jen Tzou, Taipei County (TW); June Che Lu, Taipei County (TW); Yi Cheng Lin, Taipei County (TW)

(73) Assignee: Nan Ya Plastics Corporation, Taipei City (TW)

( * ) Notice: Subject to any disclaimer, the term of this patent is extended or adjusted under 35 U.S.C. 154(b) by 275 days.

(21) Appl. No.: 12/724,030

(22) Filed: Mar. 15, 2010

(65) Prior Publication Data
US 2011/0224345 A1 Sep. 15, 2011

(51) Int. Cl.
*C08K 3/36* (2006.01)
*C08K 5/53* (2006.01)
*C08L 61/14* (2006.01)
*C08L 63/04* (2006.01)

(52) U.S. Cl. ........ 523/451; 523/427; 523/429; 523/445; 523/456; 523/457; 523/466; 525/481; 525/482; 525/484; 525/486; 525/489; 525/490

(58) Field of Classification Search .................. None
See application file for complete search history.

(56) References Cited

U.S. PATENT DOCUMENTS 3,536,734 A * 10/1970 Vegter et al. .................. 549/517
2011/0144272 A1* 6/2011 Shirrell .......................... 525/139

OTHER PUBLICATIONS

Liu, C. Y., Lu, J.C., and Hsu, S. W., A Novel Halogen-Free, Phosphorous-free and Heat Resistant Material for Copper Clad Laminate, the 3rd IMPACT, Oct. 22, 2008.
Lu, J.-C. and Hwang, Y.-T., A Novel Resin Composition for Low Dk Copper Clad Laminate, IMPACT Conference 2009, Oct. 21, 2009.

* cited by examiner

*Primary Examiner* — Robert Sellers
(74) *Attorney, Agent, or Firm* — Ming Chow; Sinorica, LLC

(57) ABSTRACT

A low dielectric resin varnish composition for laminated printed circuit boards, wherein the resin composition includes (A) Dicyclo-pentadiene-Phenolic Novolac resin (abbreviated as DCPD-PN); or (B) at least one kind of dicyclopentadiene Phenolic Novolac Epoxy resins(DCPD-PNE, referred to as Resin 1); or (C) a novel Dicyclopentadiene-Dihydrobenzoxazine resin (DCPD-BX, referred to as Resin 2); and (D) Flame retardant agent, curing agent and accelerating agent solutions.

14 Claims, No Drawings

LOW DIELECTRIC RESIN VARNISH COMPOSITION FOR LAMINATES AND THE PREPARATION THEREOF

FIELD OF THE INVENTION

The invention concerns a resin varnish composition with low dielectric constant, high thermal stability, low moisture absorption and superior fire retardance which can meet UL94 V-0 flame retardant test for new laminates used in high-performance circuit boards.

BACKGROUND OF THE INVENTION

With the rapid technological advances, many of the computer information industry, communication and consumer electronic products are changing very fast. Looking at the entire electronics industry, the development features are:
1. Increasingly high application frequency,
2. Higher and higher manufacturing technology level.

As for printed circuit boards, the direction of development is becoming low dielectric, low thermal expansion, multi-layer, high thermal resistance and so on, meanwhile complying with environment-friendly requirements; electronics and communication products also tend to be light, thin, short and to meet high-reliability, multi-function and environmental protection requirements. Since the high-frequency technology is being used in the wireless networks and communication equipments, the demand for high-frequency substrates is bound to become the future trend of development. In short, high-frequency communication substrate materials used require nothing more than to send data quickly and not to cause data loss or interference in the process of transmission; therefore, high-frequency communication equipments selected in production must have the following basic features:
(1) Small and stable dielectric constant,
(2) Low dissipation factor,
(3) Low water absorption,
(4) Good chemical resistance,
(5) Good thermal resistance.

The electrical characteristics of the printed circuit board material depend on the three main composite material types of the substrate: (i) resin, (ii) filler, and (iii) reinforcement materials. As for the resin system, the current used FR-4 (Tg140° C.) substrate made from the combination of epoxy resin (such as Nan Ya's NPEB454A80) and glass fiber (E glass) shows a "dielectric constant" (abbreviated as Dk) value of 4.6 only, which can not meet the requirements in the field of the high frequency transmission. Different resin systems (such as "bismaleimide triazine" resin (abbreviated as BT), cyanate ester resin, PTFE resins (Polytetrafluoroethylene) and so on are gradually developed, but the new developed resin system shows big deviations from the current substrate manufacturing and processing conditions, and can not be used in the existing equipments, thus it can not be widely applied.

SUMMARY OF THE INVENTION

The Technical Issues to be Solved

The development tendency of printed circuit boards is light, thin, short, small, sophisticated and higher frequency application in order to avoid data loss and interference during transmission process, the used resin must not only possess excellent electrical characteristics, but also the new developed low dielectric resin varnish composition needs to be operated under the existing conditions of operation processes and equipments to meet the environment requirements, this technique has become the important issue which the industry must overcome.

The Technical Means to Solve Issues

In view of the above-mentioned issues, the present inventor, after many years of research and testing, found a resin with a saturated cyclic structure, i.e. having a saturated ring skeleton in its chemical structure, which can effectively reduce the substrate's thermal expansion coefficient, dielectric constant and dissipation factor; when the resin is used in the resin varnish formulation, it may get excellent electrical characteristics such as low dielectric constant Dk and low dissipation factor Df. The resin also can match with various types of curing agents to be processed in the existing equipments to meet the different needs of the substrate.

In accordance with this invention, the main purpose is to provide a circuit substrate with low dielectric constant, low dissipation factor, low moisture absorption and high thermal stability, a cheap naphtha cracking by-product—"dicyclopentadiene" (abbreviated as DCPD) is used in the substrate as a raw material, the raw material itself having a rigid aliphatic cyclic three-dimensional structure skeleton is reacted with a phenolic compound to synthesize a phenolic resin (dicyclopentadiene-phenolic Novolac, DCPD-PN) containing a DCPD structure, and then this DCPD resin is reacted with dihydrobenzoxazine (BX) or with epoxy resin to obtain dicyclopentadiene-dihydrobenzoxazine resin (DCPD-BX); or to generate a DCPD-containing epoxy resin (Phenol Novolac Epoxy, DCPD-PNE), the resulted resin can be used to prepare a low dielectric, thermal stability, low moisture absorption circuit board, and copper clad laminates can be very easily processed and manufactured with current equipments and processing conditions.

The above-mentioned low dielectric resin varnish composition including (A) DCPD-containing phenolic resin, (B) one or more of the above epoxy resins or one of the epoxy resin with DCPD (DCPD-PNE); (C) DCPD-containing DCPD-BX resin; and (D) flame retardant agent, curing agent and accelerating agent is made by mixing evenly (A), (B), (C) or (B)+(C) and (D) in a certain percentage of solvent, thus the resin varnish formulations used in the present invention laminates are obtained, wherein Main agent: The DCPD-PN raw material is reacts with Epichlorohydrin (ECH) at a fixed equivalent ratio in the presence of NaOH to synthesize DCPD-epoxy resin (DCPD-PNE). Another BX resin is made from reacting DCPD-PN as a raw material with paraformaldhyde and aniline at a fixed equivalent ratio.

Curing gent: It is predominantly Nan Ya's NPEH-710S or 710H; besides in order to increase DCPD content, DCPD-PN can also be used as a curing agent.

Flame retardant agent: At present, three types of commonly used flame retardant agents are (I) traditional brominated flame retardants, such as tetrabromobisphenol (TBBA); (II) phosphorus flame retardants, such as a phosphate compound (DOPO), (III) additive type inorganic flame retardants, such as $Al_2O_3$, ATH, or any flame retardant agent may not be incorporated.

The inventive resin composition for laminates is prepared via the following steps:
1. Firstly the naphtha cracker product-dicyclopentadiene having a rigid three-dimensional cyclic aliphatic skeleton is reacted with a phenolic compound to give (A) dicyclopentadiene phenolic resin (DCPD-PN);

2. and then the said DCPD-PN having DCPD component is reacted with epichlorohydrin (ECH) for the epoxidation to form dicyclopentadiene phenolic epoxy resin (DCPD-PNE, also called Resin 1); or 3. DCPD-PN is reacted with a primary amine compound having both mono-functional group and bi-functional group, formaldehyde or paraformaldhyde compound (i.e. polyformadhyde, or polyoxymethylene) to attain dicyclopentadiene-dihydrobenzoxazine (DCPD-BX) resin, and also called Resin 2.

The inventive resin composition for laminates possesses a saturated multi-ring structure, thus has a better chemical and physical properties than conventional epoxy resins, when the fiberglass cloth is impregnated into the resin varnish formulation, then hot-press hardened, resulted in a circuit board with superior electrical properties, high thermal stability and low moisture absorption, applicable to general circuit boards, or high-frequency, high-function laminated circuit boards.

THE DETAILED DESCRIPTION OF THE INVENTION

The invention relates to a low dielectric resin varnish composition for laminates, wherein the resin composition has a low dielectric constant (1 GHz) range of about 3.89 to 4.35, with a high end (maximum dielectric constant value) at about 4.30-4.35. The resin composition includes (A) dicyclopentadiene—phenolic resin (DCPD-PN); or (B) one or a variety of epoxy resins (DCPD-PNE), or (C) a new type of dicyclopentadiene-dihydrobenzoxazine (DCPD-BX) resin; or (B)+(C) resins and (D) flame retardant agent and curing accelerator.

Among them, a DCPD-containing (A) dicyclopentadiene-phenolic resin (DCPD-PN) is prepared by reacting (a) dicyclopentadiene with (b) a phenolic compound. Its structural formula is shown as the following formula (I):

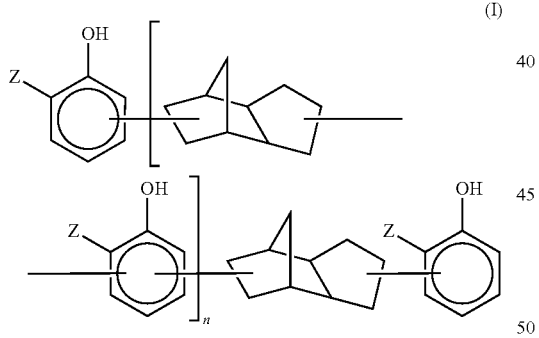

(I)

wherein
Z: —$CH_3$.—$C_2H_5$.—$C(CH_3)_3$.—H
n: 0.5~1.5

Through a modification or a change reaction, a variety of patterns can be synthesized, its synthesis is described in detail as follows Preparation of DCPD-PN In a 5 L four-neck glass reaction vessel with heating jackets, temperature control devices, an electric mixer, and condensing tubes, 940 grams of a phenolic compound and 2 wt % (based on the weight of the phenolic compound) of Lewis acid catalyst ($AlCl_3$) are added, warming to 110° C. with stirring, and reacting to 120° C., 132 grams of DCPD is dropped into the reaction mixture to react for 4 hours at this constant temperature, then the resulted reaction solution is neutralized with sodium hydroxide and extracted with clean water to remove salts and the catalyst, finally the excess reactants are removed at 180° C. temperature and 70 torrs pressure to get the product of DCPD-PN.

In the above preparation of DCPD-PN, (a) dicyclopentadiene is a naphtha cracking by-product, (b) phenolic compounds, are generally phenol, o-cresol, bisphenol (Bisphenol-A), 4,4'-bisphenol methane (Bisphenol-F), 4,4'-bisphenol sulfone (Bisphenol-S) or phenolic formaldehyde resin, the best is bisphenol or phenol-formaldehyde resins.

The solvent used in DCPD-PN preparation is of no particular restriction as long as the reactants can be dissolved, and most preferably a hydrocarbon solvent, such as toluene, xylene, etc.

In accordance of the present invention, DCPD-PN can be added as a curing agent to raise the content of DCPD, the following phenolic resin curing agent can also be used, such as polyvalent amines, polyvalent carboxylic acids, dicyanodiamide, anhydrides, phenol-formaldehyde resin (Phenol Novolac, referred to as PN), o-cresol-formaldehyde resin (Cresol Novolac, referred to as CN), melamine phenol formaldehyde resin (Melamine Phenol Novolac, referred to as MPN), bisphenol formaldehyde resin (BPA Phenol Novolac, referred to as BPA-PN), tetraphenol ethane resin (Tetra-Phenol Novolac, referred to as TPN), etc.

The components of (B) in the inventive resin varnish composition is one or more of epoxy resins, in which dicyclopentadiene epoxy resin (DCPD-PNE) also abbreviated as Resin 1 is an epoxy resin produced from reacting DCPD-PN with epichlorohydrin. Its structural formula is shown as following formula (II):

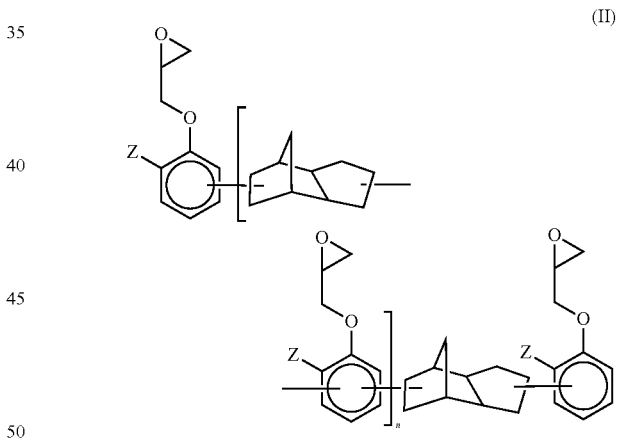

(II)

wherein
Z: —$CH_3$.—$C_2H_5$.—$C(CH_3)_3$.—H
n: 0.5~1.5

Preparation of DCPD-PNE (Resin 1)

In a 5 L four-neck glass reaction vessel with heating jackets, temperature control devices, an electric mixer, and condensing tubes, 500 grams of DCPD-PN, 2927.2 grams of epichlorohydrin are added, warmed to 55° C. for pre-dissolving, and therein 281 g of sodium hydroxide is dropped into for 4~6 hours, then heated to 78° C., and reacted at 110 Torrs pressure for 1 hour, finally the excess reactants are removed at 180° C. temperature and 70 torrs pressure, thereby the product DCPD-PNE is secured.

The so-called epoxy resin can also includes bisphenol (BPA) type epoxy resin, brominated BPA type epoxy resin, phenolic type epoxy resin and phosphate type epoxy resin.

(C) dicyclopentadiene-dihydrobenzoxazine resin (DCPD-BX) having DCPD component also called Resin 2 is obtained by reacting the following 3 compounds: (1) dicyclopentadiene-phenolic resin (DCPD-PN), i.e. the above component A; (2) a primary amine compound with mixed mono-functional group and bi-functional groups; (3) formaldehyde or paraformaldehyde. Its structural formula is shown as following formula (III):

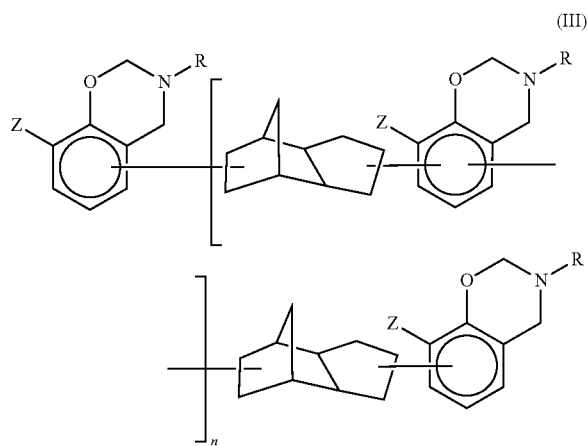

Z: —CH$_3$.—C$_2$H$_5$.—C(CH$_3$)$_3$.—H
n: 0~1
R: alkyl or aryl

A variety of types can be gained through modification, its synthesis examples will be illustrated in detail as follows:

Preparation of DCPD-BX (Resin 2)

In a 5 L four-neck glass reaction vessel with heating jackets, temperature control devices, an electric mixer, and condensing tubes, 480 grams of DCPD-PN and 486 grams of paraformaldehyde are dissolved in 500 grams of toluene with stirring, and 279 grams of aniline is slowly trickles down into the resulted solution, with temperature controlled at between 60~110° C. to react for 4 to 6 hours, and then the removal of solvent and unreacted materials is conducted at 180° C. temperature and 70 torrs pressure to achieve solid dicyclopentadiene-dihydrobenzoxazine resin.

The raw material (1) for the preparation of DCPD-BX Resin 2 is (A) dicyclopentadiene phenolic resin (DCPD-PN) having DCPD component.

The raw material (2) for the preparation of DCPD-BX Resin 2 is a primary amine compound with mixed mono-functional group and bi-functional groups, which generally includes methyl amine, ethyl amine, aniline, o-toluidine, o-methoxy aniline (i.e. anisidine); can also be aliphatic or aromatic amine compounds, and most preferably is aniline or 2-amino diphenyl methane.

The raw material (3) for the preparation of DCPD-BX Resin 2 is formaldehyde or paraformaldhyde compound, in which formaldehyde, paraformaldehyde or formaldehyde vapor are generally used, while paraformaldehyde is the best.

The solvent used in the preparation of DCPD-BX Resin 2 is of no particular restriction as long as the reactants can be dissolved, wherein hydrocarbon solvents such as toluene, xylene are the best.

The component (D) used in the inventive resin varnish composition includes flame retardant agents and curing accelerators. Brominated flame retardant agents are mainly brominated and phosphorated resins, inorganic filler flame retardants may also be used. Brominated flame retardant agents are: tetrabromobisphenol (TBBA), NPEB-485A80 (trade name, produced by Nan Ya Plastics Corporation, bromine content of 18~21%), NPEB-454A80 (trade names, produced by Nan Ya Plastics Corporation, bromine content of 18~21%). Phosphorus flame retardants are DOPO (9,10-dihydro-9-oxa-10-phosphaphenanthrene-10-oxide), DOPO-Hydroquinone (DOPO-HQ), DOPO-Phenol Novolac Epoxy Resin (DOPO-PNE), DOPO-Hydroquinone-Phenol Novolac Epoxy Resin (DOPO-HQ-PNE). The inorganic filler flame retardants are mainly aluminum hydroxide, silica, barium sulfate, alumina, boron nitride and so on.

The curing accelerators also used the present invention are tertiary phosphine, tertiary amine, quaternary phosphonium salt, quaternary ammonium salt and imidazole compounds, wherein tertiary phosphines include triphenylphosphine, etc.; tertiary amines includes 3-methyl aniline, triethyl amine, tributyl amine, dimethyl ethanol amine, etc.; quaternary phosphonium salts include tetrabutyl phosphonium bromide, tetraphenyl phosphonium bromide, ethyl triphenyl phosphonium bromide, propyl triphenyl phosphonium chloride, butyl triphenyl phosphonium bromide and other halide-containing quaternary phosphonium salts; quaternary ammonium salts include tetramethyl ammonium bromide, tetraethyl ammonium bromide, tetrabutyl ammonium bromide, tri-phenylmethyl ammonium bromide, tri-phenyl ethyl ammonium bromide and other halide-containing containing quaternary ammonium salts; imidazole compounds include 2-methyl-imidazole, 2-ethyl-imidazole, 2-dodecyl-imidazole, 2-phenyl-imidazole, 4-methyl-imidazole, 4-ethyl-imidazole, 4-dodecyl-imidazole, 2-ethyl-4-methylimidazole, 2-ethyl-4-hydroxymethyl-imidazole, etc., and most suitably 2-methyl-imidazole or 2-ethyl-4-methyl-imidazole. The above-mentioned curing accelerator can be used alone or in a mixture of two or more species, its dose is 0.01~1 PHR (Parts per Hundreds of resin), and most suitably 0.04~0.15 PHR based on the total resin amount.

The low dielectric resin composition is made from the inventive synthetic resin with a cyclic structure wherein (A) DCPD-PN content represents 0~50 wt % of total resin; (B) DCPD-PNE (Resin 1) accounts for 13~60 wt % of the total resin; (C) DCPD-BX (Resin 2) accounts for 30~50 wt % of total resin, and; (D) flame retardant agents accounts for 22~32 wt % of the total resin; besides curing accelerator represents 0.01~1 PHR of the total resin; and solvents are added to adjust the varnish viscosity, they can be organic aromatic solvents, protic solvents, ketone solvents, ether solvents and ester solvents (appropriate solvents are toluene, N,N-dimethyl formamide, acetone, methyl ethyl ketone, 1-methoxy-2-propanol, ethyl acetate and so on.) The above-mentioned Resin 1, Resin 2 may be used alone or together or blended with other epoxy resins.

In the manufacture of printed circuit board laminates, the glass fiber cloth is impregnated in the above-mentioned formulation composition, and then heated, so that the impregnated glass fiber cloth is dried into a prepreg, and copper foil can be put on one side or both sides of the prepreg, thereby one or more of the resulted prepregs can be brought together to the form a laminate, which is heated and pressurized to obtain a copper clad laminate (CCL). The curing temperature range of this resin varnish composition is from 30 to 300° C., preferably 150 to 210° C.

EXAMPLES

The present invention will be described in detail below with reference to numerous examples, the various code numbers and the ingredients used in examples and comparative examples are as follows:

Resin 1: The Inventive component (B) DCPD-PNE resin: its epoxy equivalent ranging from 270 to 230 g/eq.
Resin 2: The Inventive component (C) DCPD-BX resin: its nitrogen content 6.2 wt %.
Resin.3: The brominated resin produced by Nan Ya Plastics Corporation, trade name NPEB-485A80.
Resin 4: Nan Ya Plastics Corporation's phosphorated resin (DOPO-638), trade name 210A70.
Resin 5: Nan Ya Plastics Corporation's phosphorated resin (DOPO-HQ-638), trade name 220A70.
Curing agent 1: NanYa Plastics Corporation's phenolic resin, trade name 710HA65
Curing agent 2: NanYa Plastics Corporation's phenolic resin, trade name 710SA65.
Curing agent 3: The Inventive DCPD-PN.
Flame retardant agent 1: brominated flame agent, tetrabromo bisphenol (TBBA).
Flame retardant agent 2: Japan DaiHachi Chemical Company's phosphorus-containing flame agent, trade name PX-200.
Flame retardant agent 3: aluminum hydroxide (ATH) filler.
Flame retardant agent 4: silicon dioxide (SiO2) filler.
Curing accelerator 2M1: 2-methylimidazole, 14.2 wt % dissolved in DMF.
Glass Fiber Cloth 7628: NanYa Plastics Corporation's glass fiber cloth.

Example 1

DCPD-PNE is used as a base resin and matched with curing agent 710HA65; TBBA is used as a flame retardant agent with their formulations detailed in Table 1, then the solvent acetone is added to adjust the solid content of the resulted resin varnish composition to be 65%, the 7628 glass fiber cloth is impregnated in the above varnish resin solution, and then a prepreg obtained is taken out from impregnating machine at the temperature of 170° C., dried for a few minutes and via adjusting drying time so that after drying the melt viscosity of the prepreg is controlled between 4,000~10,000poise, and finally eight film layers are stacked between two 35-um-thick copper foils, under the pressure of 25 kg/cm², the temperature control is as follows:

85° C. ⟶ 85° C. ⟶ 200° C. ⟶ 200° C. ⟶ 130° C.
20 min      30 min      120 min      cooling slowly After hot-pressing, an 1.6 mm-thick copper clad laminate is resulted. The performance of the composition is detailed in Table 1

Example 2

Following the same steps as Example 1, except that the curing agent is changed to be 710SA65, the performance of the resulted composition is detailed in Table 1.

Example 3

Repeating Example 1, except that the curing agent is changed to be DCPD-PN, the performance of the resulted composition is detailed in Table 1.

Example 4

DCPD-PNE is used as the base resin and matched with curing agent 710HA65, the flame retardant agent is changed to be PX-200 phosphorus flame retardant agent, the formulation compositions are detailed in Table 1; and repeating the manufacturing steps of the copper clad laminate of Example 1, the features of the resulted composition are set in Table 1.

Example 5

Repeating Example 4, except that the curing agent is changed into 710SA65, the performance of the resulted composition is detailed in Table 1.

Example 6

Repeating Example 4, except that the curing agent is substituted by DCPD-PN, the performance of the resulted composition is detailed in Table 1.

Example 7

DCPD-BX is used as the base resin and DCPD-PNE resin is added to adjust the equivalent, matched with curing agent 710HA65, and aluminum hydroxide and silica are used as flame retardant agents, the formulation composition is detailed in Table 1, then repeating the manufacturing steps of the copper clad laminate of Example 1, the performance of the composition obtained is detailed in Table 1.

Example 8

Repeating Example 7, except that the curing agent is changed into 710SA65, the performance of the resulted composition is detailed in Table 1.

Example 9

Repeating Example 7, except that the curing agent is substituted by DCPD-PN, the performance of the resulted composition is detailed in Table 1.

Example 10

DCPD-BX is used as the base resin, matched with the phosphorated resin 210A70 and curing agent 710HA65 to get a halogen-free substrate, the formulation composition is detailed in Table 2, and in analogy to the manufacturing steps of the copper clad laminate of Example 1, the performance of the composition obtained is detailed in Table 2.

Example 11

Repeating Example 10, except that the curing agent is changed into 710SA65, the performance of the resulted composition is detailed in Table 1.

Example 12

Repeating Example 10, except that the curing agent is changed into DCPD-PN, the performance of the resulted composition is detailed in Table 1.

Example 13

DCPD-BX is used as the base resin matched with the phosphorated resin 210A70 and curing agent 710HA65 to get a halogen-free substrate, the formulation composition is detailed in Table 2, and in analogy to the manufacturing steps of the copper clad laminate of Example 1, the performance of the composition obtained is detailed in Table 2.

Example 14

Repeating Example 13, except that the curing agent is changed into 710SA65, the performance of the resulted composition is detailed in Table 1.

Example 15

Repeating Example 13, except that the curing agent is changed into DCPD-PN, the performance of the resulted composition is detailed in Table 1.

Comparative Example 1

The brominated epoxy resin (Nan Ya's brominated epoxy resin, trade name NPEB-485A80) is used as the based resin and matched with curing agent 710HA65, the formulation composition is detailed in Table 2, and in analogy to the manufacturing steps of the copper clad laminate of Example 1, the performance of the composition obtained is detailed in Table 2.

Comparative Example 2

Repeating Comparative Example 1, except that the curing agent is changed into 710SA65, the performance of the resulted composition is detailed in Table 1.

Comparative Example 3

Repeating Comparative Example 1, except that the curing agent is changed into DCPD-PN, the performance of the resulted composition is detailed in Table 1.

[Measurement Note]

1. Varnish Gelling Time (sec):
   0.3 ml of resin varnish is put on the heating plate at 170° C., the gelling time thereof is measured.
2. Glass Transition Temperature (° C.):
   Glass transition temperature is measured with a differential scanning calorimeter (DSC) at the heating rate=20° C./min.
3. Fire Resistance
   Samples are cut into specimens with a rectangle shape of 0.5 in×4.7 in. A burner flame is applied to the free end of the specimen for two 10 second intervals separated by the time it takes for flaming combustion to cease after the first application. The durations of flaming combustion after the each burner flame application are recorded.
4. Water Absorptivity (%):
   Specimens are heated in a pressure cooker at 120° C. and 2 atm pressure.
5. Dissipation Factor (1 GHz):
   Test samples are cut into specimen pieces with a square shape of 5 cm×5 cm in which 3 points are taken to measure the plate thicknesses, then the specimen is clamped in a folder and put into the analytical instrument for the dielectric measurements, finally the average value are calculated.
6. Dielectric Constant (1 GHz):
   The etched substrate is cut to a 5 cm² square specimen, baked in the oven at 105° C. for 2 hours, then it is taken out for the thickness measurement at 3 points of the specimen with a plate thickness gauge, then the specimen is clamped in a folder and put into the dielectric instrument for measurements, the average value of 3 points data is calculated.

TABLE 1

Table 1: Resin Varnish Formulation Composition and performance

| | Example 1 | Example 2 | Example 3 | Example 4 | Example 5 | Example 6 | Example 7 | Example 8 | Example 9 |
|---|---|---|---|---|---|---|---|---|---|
| Resin 1 DCPD-PNE | 60 | 60 | 52 | 51 | 51 | 43 | 13 | 13 | 13 |
| Resin 2 DCPD-BX | | | | | | | 52 | 52 | 50 |
| Resin 3 NPEB-485A80 | | | | | | | | | |
| Resin 4 210A70 | | | | | | | | | |
| Resin 5 220A70 | | | | | | | | | |
| Curing agent 1 710HA70 | 15 | | | 21 | | | 3 | | |
| Curing agent 2 710SA70 | | 15 | | | 21 | | | 3 | |
| Curing agent 3 DCPD-PN | | | 25.7 | | | 34 | | | 6 |
| Flame Retardant Agent 1 TBBA | 25 | 25 | 22.3 | | | | | | |
| Flame Retardant Agent 2 PX-200 | | | | 28 | 28 | 23 | | | |
| Flame Retardant Agent 3 ATH | | | | | | | 16 | 16 | 15.5 |
| Flame Retardant Agent 4 SiO2 | | | | | | | 16 | 16 | 15.5 |
| Accelerator 2MI(PHR) | 0.3 | 0.25 | 0.31 | 0.28 | 0.24 | 0.28 | 0.5 | 0.5 | 0.5 |
| Varnish | 380 | 364 | 372 | 375 | 370 | 368 | 365 | 355 | 361 |

TABLE 1-continued

Table 1: Resin Varnish Formulation Composition and performance

| | Example 1 | Example 2 | Example 3 | Example 4 | Example 5 | Example 6 | Example 7 | Example 8 | Example 9 |
|---|---|---|---|---|---|---|---|---|---|
| Gelling Time, sec | | | | | | | | | |
| Glass Transition Temperature ° C. | 159 | 172 | 164 | 157 | 171 | 165.5 | 163.5 | 173.5 | 167.2 |
| Fire Resistance | 94V-0 | 94V-0 | 94V-1 | 94V-0 | 94V-0 | 94V-1 | 94V-0 | 94V-0 | 94V-0 |
| Water Absorptivity % | 0.08 | 0.07 | 0.07 | 0.08 | 0.07 | 0.08 | 0.09 | 0.07 | 0.08 |
| Dielectric Constant (1 GHz) | 4.22 | 4.2 | 4.18 | 4.2 | 4.21 | 4.18 | 3.9 | 3.89 | 3.92 |
| Dissipation Factor (1 GHz) | 0.014 | 0.012 | 0.012 | 0.014 | 0.016 | 0.012 | 0.008 | 0.009 | 0.009 |

TABLE 2

Resin Varnish Formulation Composition and performance

| | Example 10 | Example 11 | Example 12 | Example 13 | Example 14 | Example 15 | Comparative Example 1 | Comparative Example 2 | Comparative Example 3 |
|---|---|---|---|---|---|---|---|---|---|
| Resin 1 DCPD-PNE | | | | | | | | | |
| Resin 2 DCPD-BX | 52 | 52 | 50 | 52 | 52 | 50 | | | |
| Resin 3 NPEB-485A80 | | | | | | | 78 | 78 | 68 |
| Resin 4 210A70 | 13 | 13 | 13 | | | | | | |
| Resin 5 220A70 | | | | 13 | 13 | 13 | | | |
| Curing agent 1 710HA70 | 3 | | | 3 | | | 22 | | |
| Curing agent 2 710SA70 | | 3 | | | 3 | | | 22 | |
| Curing agent 3 DCPD-PN | | | 6 | | | 6 | | | 32 |
| Flame Retardant Agent 1 TBBA | | | | | | | | | |
| Flame Retardant Agent 2 PX-200 | | | | | | | | | |
| Flame Retardant Agent 3 ATH | 16 | 16 | 15.5 | 16 | 16 | 15.5 | | | |
| Flame Retardant Agent 4 SiO$_2$ | 16 | 16 | 15.5 | 16 | 16 | 15.5 | | | |
| Accelerator 2MI(PHR) | 0.25 | 0.21 | 0.26 | 0.28 | 0.24 | 0.28 | 0.1 | 0.1 | 0.1 |
| Varnish Gelling Time sec | 360 | 355 | 345 | 335 | 345 | 350 | 320 | 318 | 324 |
| Glass Transition Temperature ° C. | 158 | 173 | 160 | 162 | 175 | 168 | 153 | 167 | 162 |
| Fire Resistance | 94V-0 | 94V-0 | 94V-1 | 94V-0 | 94V-0 | 94V-1 | 94V-0 | 94V-0 | 94V-0 |
| Water Absorptivity % | 0.08 | 0.07 | 0.07 | 0.08 | 0.07 | 0.08 | 0.07 | 0.08 | 0.08 |
| Dielectric Constant (1 GHz) | 4.32 | 4.18 | 4.16 | 4.35 | 4.2 | 4.15 | 4.7 | 4.6 | 4.4 |
| Dissipation Factor (1 GHz) | 0.014 | 0.013 | 0.012 | 0.015 | 0.014 | 0.012 | 0.03 | 0.028 | 0.025 |

EFFICACY OF INVENTION

The copper clad laminates made from the formulations containing DCPD-PNE in Example 1~6 exhibit the characteristics of dielectric constant 4.18~4.21 and dissipation factor 0.012~0.016; those made from of the formulations containing DCPD-BX in Example 10~15 offer the properties of dielectric constant 4.15~4.32 and dissipation factor 0.012~0.016; in the formulations of Example 7~9, both of DCPD-PNE and DCPD-BX are used, the resulted laminates show the characteristics of low dielectric constant 3.89~3.92 and dissipation factor 0.008~0.009; significantly better than the laminates produced from the other formulations without the resin having DCPD structure, the latter have the properties of dielectric constant 4.4~4.7 and dissipation factor 0.025~0.03.

As revealed in Examples • Table 1 and Table 2, the fiberglass cloth impregnated in the DCPD structure containing lacquer resin after curing does have low moisture absorptivity, low dielectric constant and low dissipation factor. The copper clad laminates made from the pressure lamination of the resin containing DCPD-PN as a curing agent can effectively reduce the dielectric constant and dissipation factor; furthermore if DCPD-BX resin is added, since the content of the resin with DCPD structure increases, and the flame retardant fillers are present in the resin varnish composition, then the dielectric constant can be further reduced and UL94V-0 flammability standards can also be met and a good thermal stability is achieved.

What we claimed is:

1. A low dielectric resin varnish composition for laminates, in which the resin composition includes one or more than one base resin and (D) flame retardant agent, curing agent, accelerator and solvent, wherein said basic resin comprising:
   30 to 50% (based on the total resin weight) (C), dicyclopentadiene-dihydrobenzoxazine (DCPD-BX, Resin 2), and
   1~50% (based on the total resin weight) (A), dicyclopentadiene-phenolic resin (DCPD-PN); or
   13~60% (based on the total resin weight) (B), one or more of the epoxy resins, comprising dicyclopentadiene-phenol novolac epoxy (DCPD-PNE, Resin 1),
   wherein, component (A) dicyclopentadiene-phenolic resin (DCPD-PN) is prepared by reacting dicyclopentadiene with phenolic compounds having the structural formula as follows:

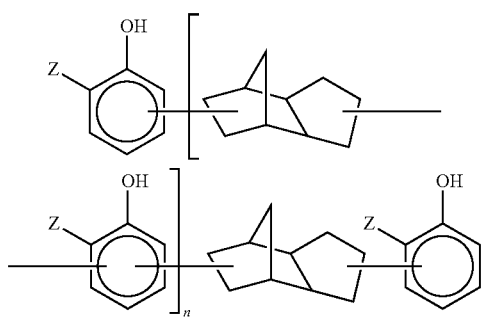

Z: —CH$_3$,—C$_2$H$_5$,—C(CH$_3$)$_3$,—H
n: 0.5~1.5;

component (B) one or more of the epoxy resin, DCPD-PNE, (Resin 1) is prepared by reacting DCPD-PN resin and epichlorohydrin, its structural formula is as follows:

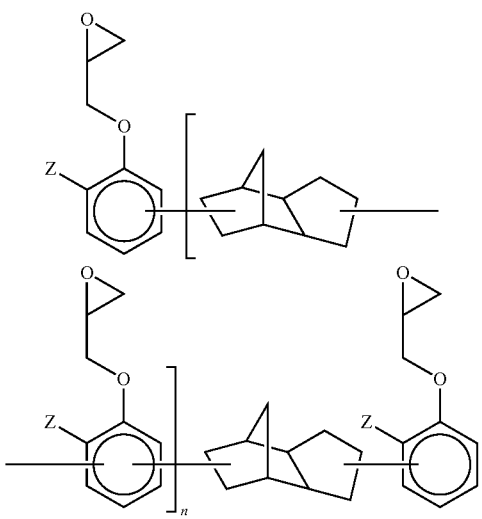

Z: —CH$_3$,—C$_2$H$_5$,—C(CH$_3$)$_3$,—H
n: 0~2; and component (C) dicyclopentadiene-dihydrobenzoxazine, (DCPD-BX, Resin 2) is prepared by mixing and stirring to react (1) dicyclopentadiene-phenolic resin, (2) primary amine compound with mixed mono-functional group and bi-functional group and (3) formaldehyde or paraformaldhyde compound, its structural formula is as follows:

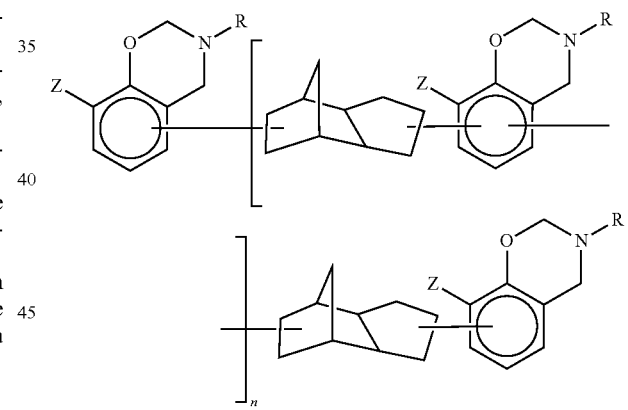

Z: —CH$_3$,—C$_2$H$_5$,—C(CH$_3$)$_3$,—H
R: alkyl or aryl
n: 0~1.

2. The low dielectric resin varnish composition for laminates as claimed in claim 1, wherein dicyclopentadiene used to produce (A) dicyclopentadiene-phenolic resin (DCPD-PN) is a naphtha cracking by-product; and phenolic compounds are selected from phenol, o-cresol, bisphenol (Bisphenol-A), 4,4'-diphenyl methane (Bisphenol-F), 4,4'-diphenyl sulfone (Bisphenol-S) or phenolic resin.

3. The low dielectric resin varnish composition for laminates as claimed in claim 1, wherein components (A) dicyclopentadiene-phenolic resin (DCPD-PN) is can be used as a curing agent in order to increase DCPD content.

4. The low dielectric resin varnish composition for laminates as claimed in claim 1, wherein the resin curing agent can be selected from curing agents for other resins such as phenolic resin, amines, organic acids and acid anhydride type curing agents-such as polyvalent amines, polyvalent carboxylic acid, dicyanodiamide, anhydride, phenol-formaldehyde resin (Phenol Novolac, referred to as PN), o-cresol-formaldehyde resin (Cresol Novolac, referred to as CN), melamine-phenol formaldehyde resin (Melamine Phenol Novolac, MPN), bisphenol formaldehyde resin (BPA Phenol Novolac, BPA-PN), tetraphenol ethane resin (TetraPhenol Novolac, TPN) and dicyclopentadiene-phenolic resin (Dicyclopentadiene-Phenolic Novolac, DCPD-PN), etc.

5. The low dielectric resin varnish composition for laminates as claimed in claim 1, wherein (B) one or more of the epoxy resin (DCPD-PNE)-Resin 1; (C) dicyclopentadiene dihydrobenzoxazine (DCPD-BX)-Resin 2 is used together, or in a mixture with other epoxy resins.

6. The low dielectric resin varnish composition for laminates as claimed in claim 5, wherein a primary amine compound with mixed mono-functional group and bi-functional group is used in the production of (C) dicyclopentadiene-dihydrobenzoxazine-Resin 2 (DCPD-BX), and said primary amine compound is a primary amine, wherein said primary amine comprises aliphatic or aromatic amine compounds.

7. The low dielectric resin varnish composition for laminates as claimed in claim 5, wherein formaldehyde or paraformaldehyde compound used for the preparation of (C) dicyclopentadiene-dihydrobenzoxazine-Resin 2 (DCPD-BX) is selected from formaldehyde, paraformaldehyde, or formaldehyde vapor.

8. The low dielectric resin varnish composition for laminates as claimed in claim 5, wherein the other epoxy resin is selected from a brominated epoxy resin or phosphorated epoxy resin.

9. The low dielectric resin varnish composition for laminates as claimed in claim 1, wherein component (D) flame retardant agent is a brominated or phosphorated compound, or an inorganic filler flame retardant agent.

10. The low dielectric resin varnish composition for laminates as claimed in claim 9, wherein the brominated flame retardant agent is mainly a tetrabromo bisphenol (TBBA) or tetrabromo bisphenol epoxy resin.

11. The low dielectric resin varnish composition for laminates as claimed in claim 9, wherein the phosphorated flame retardant agents are DOPO (9,10-dihydro-9-oxa-10-phosphaphenanthrene-10-oxide), DOPO-HQ (9,10-dihydro-9-oxa-10-phosphaphenanthrene-10-oxide hydroquinone) and its phenolic epoxy resin.

12. The low dielectric resin varnish composition for laminates as claimed in claim 9, wherein the inorganic filler flame retardant agents are selected from aluminum hydroxide, silica, barium sulfate, aluminum oxide and boron nitride.

13. The low dielectric resin varnish composition for laminates as claimed in claim 1, wherein said curing accelerator is used alone or in a mixture of two or more species at the same time and, the dose thereof accounts for 0.04~0.15 parts by weight per 100 parts by weight of total basic resins (phr) of the total resin.

14. The low dielectric resin varnish composition for laminates as claimed in claim 1, wherein the curing accelerator is selected from 2-methyl-imidazole (2MI), and 2-ethyl-4 methylimidazole (2E4MZ), Wherein the dose of said accelerator is from 0.21 to 0.5 phr of the total resin.

* * * * *